(12) United States Patent
Dziak et al.

(10) Patent No.: US 8,970,975 B1
(45) Date of Patent: Mar. 3, 2015

(54) SYSTEM AND METHOD FOR MONITORING PREAMBLE SIGNAL QUALITY

(71) Applicant: LSI Corporation, San Jose, CA (US)

(72) Inventors: Scott M. Dziak, Fort Collins, CO (US); Jason D. Byrne, Lyons, CO (US)

(73) Assignee: LSI Corporation, San Jose, CA (US)

( * ) Notice: Subject to any disclaimer, the term of this patent is extended or adjusted under 35 U.S.C. 154(b) by 36 days.

(21) Appl. No.: 14/044,009

(22) Filed: Oct. 2, 2013

Related U.S. Application Data

(60) Provisional application No. 61/880,259, filed on Sep. 20, 2013.

(51) Int. Cl.
*G11B 27/36* (2006.01)
*G11B 20/10* (2006.01)
*G11B 5/09* (2006.01)

(52) U.S. Cl.
CPC .......... *G11B 20/10462* (2013.01); *G11B 27/36* (2013.01); *G11B 5/09* (2013.01)
USPC ........................................................... 360/31

(58) Field of Classification Search
CPC .... G11B 27/36; G11B 5/012; G11B 2220/20; G11B 2220/90; G11B 5/09; G11B 20/1419; G11B 20/10009; G11B 20/18
USPC .................. 360/31, 29, 32, 39, 42, 49, 43, 53
See application file for complete search history.

(56) References Cited

U.S. PATENT DOCUMENTS 4,229,771 A * 10/1980 Heinz et al. ..................... 360/46

* cited by examiner

*Primary Examiner* — Nabil Hindi
(74) *Attorney, Agent, or Firm* — Suiter Swantz pc llo

(57) ABSTRACT

The disclosure is directed to a system and method of determining signal quality based upon at least one of: a comparison of energy content of the signal to a threshold energy content, a comparison of energy content of the fundamental harmonic of the signal to a specified percentage of the energy content of the signal, and a comparison of a difference between phase of the signal and a target phase to a threshold phase difference.

20 Claims, 5 Drawing Sheets

SYSTEM AND METHOD FOR MONITORING PREAMBLE SIGNAL QUALITY

PRIORITY

The present application claims priority under 35 U.S.C. §119(e) to U.S. Provisional Application Ser. No. 61/880,259, entitled SYSTEM AND METHOD FOR MONITORING PREAMBLE SIGNAL QUALITY, By Scott M. Dziak et al., filed Sep. 20, 2013. The above-referenced provisional application is hereby incorporated by reference in its entirety.

FIELD OF INVENTION

The disclosure relates to the field of signal monitoring and flaw detection during read events.

BACKGROUND

In data storage system read channel operations, read and servo events are typically prepended with periodic signals, often referred to as "preamble" signals, with substantially uniform transition spacing to align phase and gain prior to data recovery. Gain or phase errors are sometimes encountered as result of defects in storage media or environmental forces. During the signal acquisition process, gain and phase errors can significantly complicate the recovery process. It is thus advantageous to determine signal quality prior to data recovery.

SUMMARY

The disclosure is directed to a system and method for analyzing signal quality according to a plurality of factors including, but not limited to, the energy content of the signal, the energy content of the fundamental harmonic of the signal, and the phase of the signal. According to various embodiments, a series of comparisons are made utilizing the foregoing factors. The energy content of the signal is compared to a threshold energy content. The energy content of the fundamental harmonic of the signal is compared to a specified percentage of the energy content of the signal. The difference between a phase of the signal and a target phase is compared to a threshold phase difference. Then the signal quality is determined based upon at least one of: the comparison of the energy content of the signal to the threshold energy content, the comparison of the energy content of the fundamental harmonic of the signal to the specified percentage of the energy content of the signal, and the comparison of the difference between the phase of the signal and the target phase to the threshold phase difference.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

FIGS. 1A through 3B illustrate embodiments of a system and method for analyzing quality of a periodic signal, such as a preamble signal, which precedes a user data signal to align phase and gain prior to data recovery. Detecting a low or poor quality preamble signal is often indicative of fault condition, such as a media defect or a negative environmental influence. Because the user data signal is likely to be affected by the same fault condition as the preamble, it is advantageous to report marginal preamble signals or detected fault conditions. Accordingly, correctable fault conditions can be repaired before retrying data recovery, and system resources are not expended trying to read unrecoverable data.

Some existing methods of preamble qualification are lacking because they are not gain error insensitive (i.e. small signals flagged as faults), not phase error insensitive (i.e. off-phase signals flagged as faults), and fail to consider the entire preamble signal region. In addition, current early MDD architectures can result in undesirable loop coasting over certain patterns, such as read-through gap or low density parity check (LDPC) flawscan patterns. Early media defect detection (MDD) coasts loops based on change in analog-to-digital conversion (ADC) signal envelope. A pattern with 4-bit periodic intervals (e.g. 1100), sometimes referred to as a "2T pattern", may exhibit significant envelope loss even under ideal conditions, thus resulting in undesirable loop coasting. While the embodiments discussed and illustrated herein are often described according to the detection or analysis of a 2T pattern having 4-bit periodic intervals, reference to a 2T pattern (e.g. 2T signal, 2T energy, 2T bandpass filter, 2T samples) is intended to cover any nT pattern, where n is an integer value. In any of the embodiments described herein, the 2T pattern, hence the "2T" modifier, may be replaced by a 3T pattern (e.g. 111000), a 4T pattern (e.g. 11110000), or any other nT pattern.

Figure 1A:
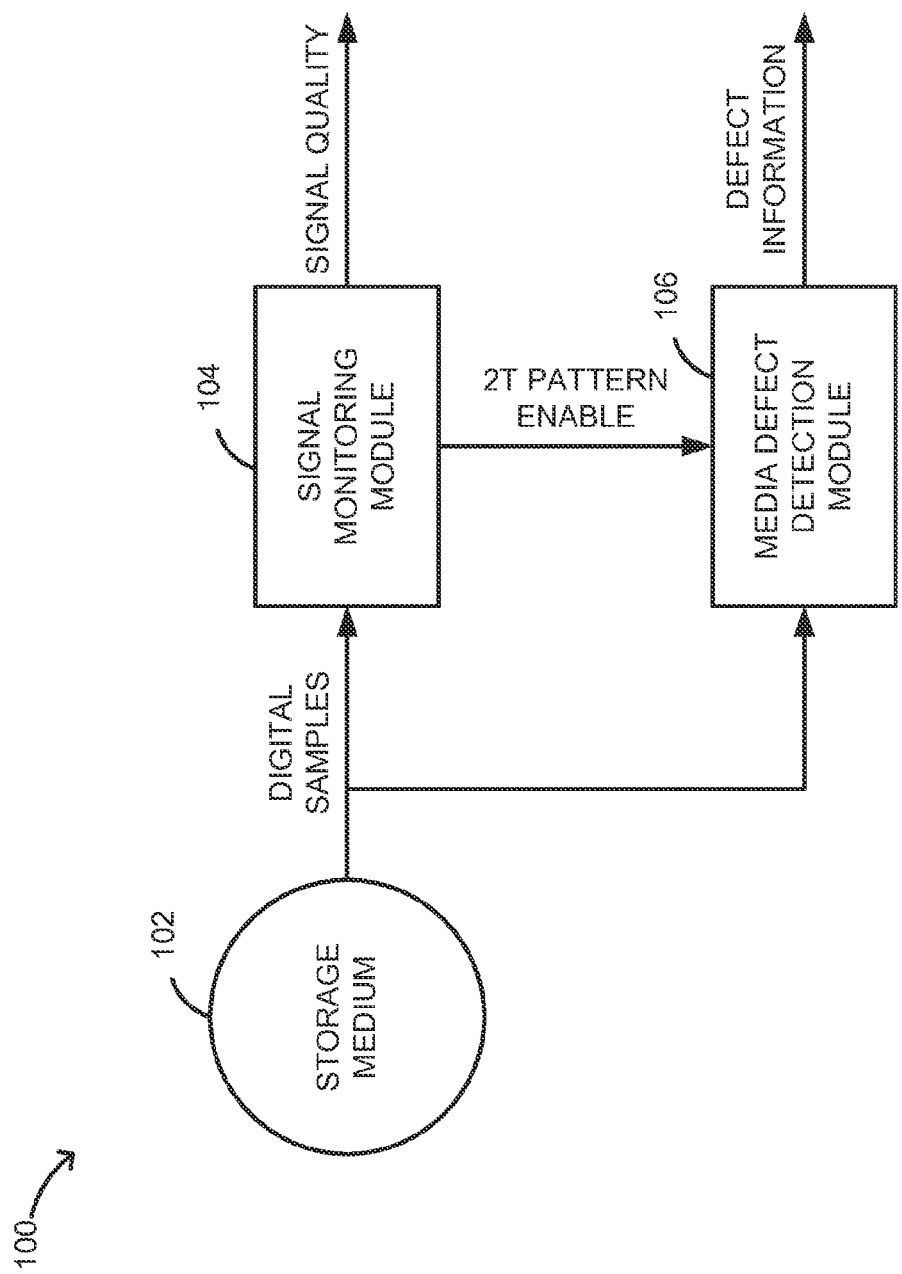
FIG. 1A is a block diagram illustrating a system for analyzing signal quality and detecting media defects, in accordance with an embodiment of the disclosure.
Figure 1B:
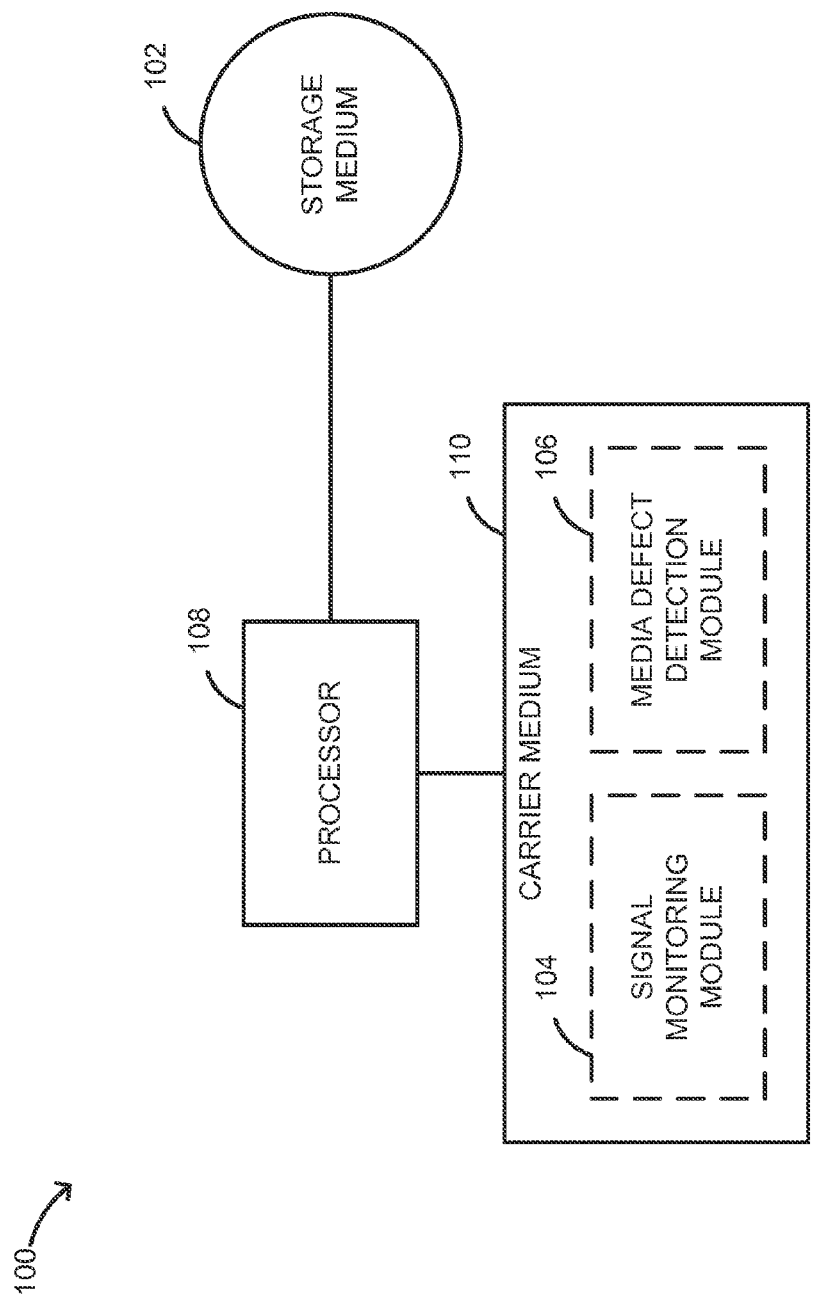
FIG. 1B is a block diagram illustrating the system for analyzing signal quality and detecting media defects, wherein a signal monitoring module and a media defect detection/classification module of the system are software or firmware modules stored by at least one carrier medium, in accordance with an embodiment of the disclosure.

FIGS. 1A and 1B illustrate embodiments of a system 100 for analyzing signal quality and detecting media defects. The system 100 includes a signal monitoring module 104 and a MDD module 106 configured to process ADC samples read from a storage medium 102, such as a hard-disk drive (HDD). To avoid undesirable loop coasting the MDD module 106 is conditioned on detection of a signal having a 2T pattern, such as a preamble signal, by the signal monitoring module 104. The signal monitoring module 104 is configured to detect 2T patterns according to at least one metric, such as signal energy or ratio of total signal energy to 2T signal energy.

In some embodiments, the signal monitoring module 104 is configured to determine the signal energy by summing squares of the ADC samples (i.e. $E_{signal} = \Sigma x^2$, where x are the ADC samples for an analyzed window of the signal). The signal monitoring module 104 compares the signal energy against a specified threshold energy (i.e. $E_{signal} > E_{thresh}$), where signals with energy content exceeding the threshold energy content are 2T signal candidates. In some embodiments, the monitoring module 104 is further configured to determine whether the energy content of the fundamental harmonic exceeds a specified percentage of the signal energy. Stated another way, the ratio of 2T energy content of the signal to total energy content exceeds a specified threshold ratio (i.e. $E_{2T}/E_{signal} > R$). In some embodiments, the 2T energy content of the signal is determined by summing squares of 2T ADC samples isolated using a 2T bandpass filter (i.e. $E_{2T} = \Sigma(x_{2T})^2$, where $x_{2T} = BPF_{2T}(x)$).

When the incoming samples are determined to belong to a 2T pattern signal, the signal monitoring module 104 is configured to enable the MDD module 106 to analyze the ADC samples for fault conditions, such as media defects. Accordingly, media defect detection is controlled to the preamble or other 2T signals. As noted above, the system and method described herein are modifiable to allow detection and monitoring of other periodic signals (e.g. 1T, 2T, 3 T . . . , nT). In some embodiments, the MDD module 106 is further configured to report defect information, such as detected defects, defect type or classification, defect correctability, and the like.

In addition to selectively enabling the MDD module 106, the signal monitoring module 104 is further configured to determine signal quality based upon energy content of the signal, energy content at the fundamental harmonic of the signal, and signal phase. The signal monitoring module 104 is configured to determine energy content of an analyzed portion of the signal by summing the squares of the ADC samples corresponding to the analyzed portion or sample window, as explained above. In some embodiments, the signal monitoring module 104 is configured to determine the mean squared energy (MSE) by summing squares of normalized ADC samples.

The signal monitoring module 104 is further configured to determine energy content at the fundamental harmonic (e.g. 2T energy content) by summing squares of the 2T ADC samples. In some embodiments, the 2T ADC samples are isolated by digitally filtering the window of ADC samples. For example, sine and cosine components derived from a discrete Fourier transform (DFT) of the signal over the analyzed window can be isolated to extract 2T samples. The signal monitoring module 104 is then enabled to determine the 2T energy by summing squares of the sine and cosine DFT components.

The signal monitoring module 104 is further configured to determine the signal phase at the output of the 2T bandpass filter. In some embodiments, the signal phase is compared against a projected target phase to determine a signal phase difference or slip, where the target phase is projected during zero phase start (ZPS) operation. The quadrant of the 2T preamble signal should not change from the value computed during ZPS. Substantial phase difference can, therefore, indicate poor signal quality or fault conditions.

With the foregoing metrics, the signal monitoring module 104 is configured to determine signal quality based upon comparisons with user, program, or system specified thresholds. The signal monitoring module 104 determines the signal is marginal (i.e. low or poor quality) when one or more conditions arise from the following: (1) energy content of the signal is less than a specified threshold; (2) ratio of 2T energy to total energy content of the signal is less than a specified ratio (i.e. 2T energy is less than a specified percentage of signal energy); or (3) difference between signal phase and target phase exceeds a specified allowable phase difference (e.g. ~½ bit). In some embodiments, the signal monitoring module 104 is further configured to report low signal quality or fault conditions by sending a notification signal or triggering an indicator, such as by setting designated flags or bits (e.g. preamble quality flag "pq_flg" and preamble quality flag triggered "PQ_FLT" bit field).

In some embodiments, as shown in FIG. 1B, at least one of the signal monitoring module 104 and the MDD module 106 is a software module executable by at least one processor 108 from at least one carrier medium 110 in the form of a programmed set of instructions. According to said embodiments, the processor 108 is communicatively coupled to the storage medium 102 and configured to execute program instructions from the carrier medium 110 to perform functions or operations described with regard to at least one of the signal monitoring module 104 and the MDD module 106. In some embodiments, one or more of the functions or operations is alternatively performed by a dedicated set of electronic circuitry or a dedicated controller. The components of system 100 are further enabled to perform any operations or functions required to carry out various steps described herein, such as the steps of method 300 described below. In some embodiments, for example, the processor 108 is configured to perform steps of method 300 in accordance with program instructions executed from the carrier medium 110.

Figure 2:
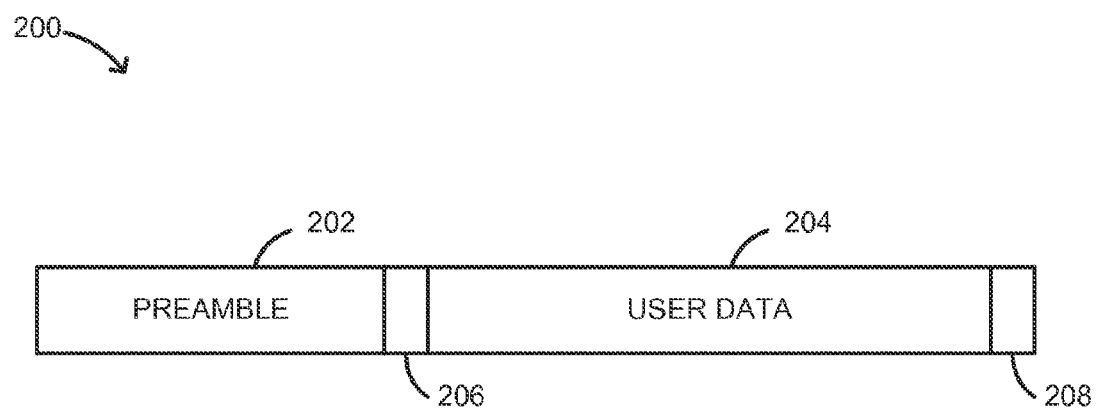
FIG. 2 illustrates various portions of a data record, in accordance with an embodiment of the disclosure.

As shown in FIG. 2, a data record 200 typically includes a preamble 202 preceding user data 204. Data records 200 are accompanied by a preamble 202 to enable read synchronization during data read-back, of timing recovery circuits in the recording channel, in preparation for reception of the stored user data 204. The boundary between the preamble 202 and user data 204 is identified by a synchronization mark 206. In some embodiments, the data record 200 further includes an error correction code (ECC) field 208 to protect data integrity of the user data 204. As discussed above, the preamble signal quality is important because it is often indicative of whether user data 204 will be successfully recovered or not.

Figure 3A:
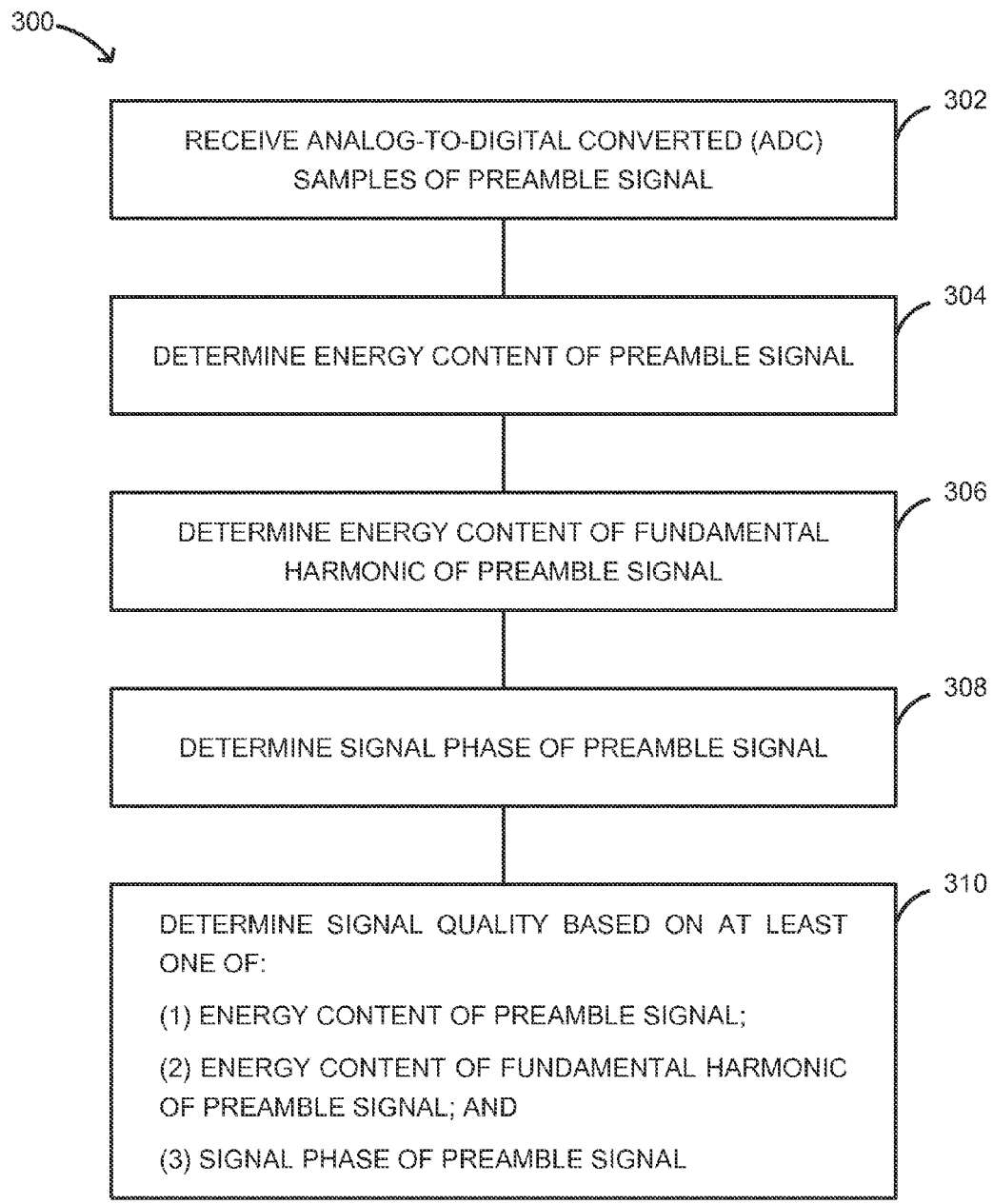
FIG. 3A is a flow diagram illustrating a method of analyzing signal quality, in accordance with an embodiment of the disclosure.
Figure 3B:
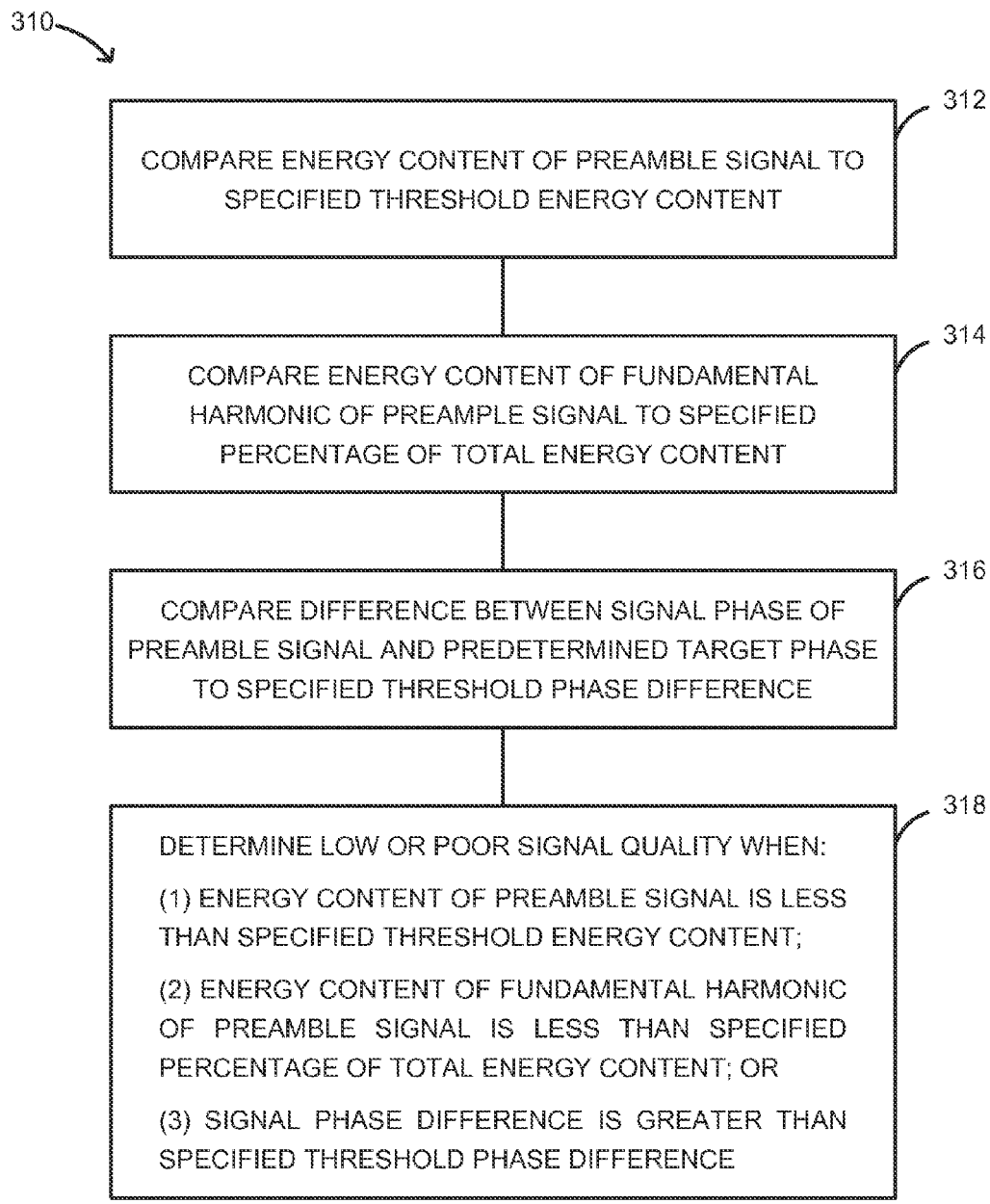
FIG. 3B is a flow diagram illustrating the method of analyzing signal quality, in accordance with an embodiment of the disclosure.

FIGS. 3A and 3B illustrate a method 300 of assessing preamble signal quality. In some embodiments, method 300 is manifested by system 100. Further, method 300 is inclusive of any steps required to carry out operations or functions described with regard to embodiments of system 100. It is noted, however, that method 300 is not restricted to any embodiment of system 100. Rather, method 300 may be embodied in any system configured to perform the following steps.

At step 302, shown in FIG. 3A, a preamble signal is read from a storage medium, such as an HDD. ADC samples of the preamble or an analyzed portion or window of the preamble are directed to a processor for pattern detection and signal quality analysis. The entire preamble signal may be analyzed by sequentially analyzing adjacent sample windows (e.g. every 4T). At step 304, the energy content (i.e. MSE) of the preamble signal for each sample window is determined by summing squares of normalized ADC samples of the respective window. At step 306, the energy content of the fundamental harmonic (i.e. 2T frequency) of the preamble signal is determined by summing squares of the DFT output cosine and sine components over the same sample window used to determine MSE. Accordingly, any delays and latencies occurring in the sample window are accounted for in both measurements of signal energy and 2T energy. At step 308, the phase difference between signal phase output by the 2T bandpass filter used to isolate 2T samples and the target phase determined during ZPS operation is determined.

At step 310, the metrics determined in steps 302 through 308 are used to determine signal quality. FIG. 1B illustrates step 310 in further detail, where the signal quality determination is based upon at least one of: (1) energy content of the preamble signal, (2) energy content of the fundamental harmonic of the preamble signal, or (3) drift or slip in signal phase of the preamble signal.

At sub-step 312, signal energy determined over at least one sample window is compared against a specified threshold energy. At sub-step 314, the fundamental harmonic energy determined over at least one sample window is compared against a specified percentage of the signal energy determined for the same sample window. In other words, the ratio of the fundamental harmonic energy to the signal energy for at least one sample window is compared against a specified threshold ratio. In some embodiments, the comparisons at sub-steps 312 and 314 are repeated until substantially all portions or sample windows of the preamble have been considered. At step 316, the phase difference between the signal phase of the 2T bandpass filter output and the projected target phase determined during ZPS are compared against a specified threshold phased difference (e.g. ½ bit difference or 1T slip).

At sub-step 318, the preamble signal is determined to have low or poor quality when any of thresholds from sub-steps 312 through 316 are violated. The preamble signal is determined to be low or poor when: (1) the signal energy is less than the specified threshold energy; (2) the ratio of fundamental harmonic energy to signal energy is less than the specified threshold energy; or (3) the difference between signal phase and target phase is less than the specified threshold difference. In some embodiments, low quality signals or fault conditions are reported by setting designated flags or bits. Further, an error message or notification can be communicated via user interface.

In some embodiments of the system 100 and method 300 described above, the value determination and comparisons may occur in parallel or in a different sequence from that described above. Some steps or operations may be omitted or superseded by specified events. For example, analyzing fundamental harmonic energy and phase difference may be unnecessary if the preamble signal is already determined to be low or poor quality based upon failure to meet the specified threshold signal energy.

In some embodiments, the three comparisons are performed over a window of ADC samples succeeding the ADC samples used for ZPS, where each check runs until the synchronization mark is detected. An advantage of the system and method described herein is that a single flag (e.g. pq_flg) can be used to indicate a failure to satisfy any of the specified thresholds. In some embodiments, this flag is sufficiently delayed with respect to a sync mark detector to ensure that when the sync mark is found, the flag is still based on the ADC samples of the 2T preamble. In some embodiments, the flag status is captured in the PQ_FLT bit field which indicates when the preamble quality flag is triggered.

It should be recognized that the various functions, operations, or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for analyzing signal quality, the system comprising at least one processor communicatively coupled to a storage medium, the at least one processor being configured to:
    receive a signal from the storage medium;
    determine an energy content of the signal;
    determine an energy content of a fundamental harmonic of the signal;
    determine a phase of the signal; and
    determine a quality of the signal based upon at least one of: the energy content of the signal, the energy content of the fundamental harmonic of the signal, and the phase of the signal.

2. The system of claim 1, wherein the at least one processor is further configured to:
    square digital samples derived from the signal; and
    determine the energy content of the signal by summing the squares of the digital samples.

3. The system of claim 2, wherein the digital samples comprise normalized digital samples.

4. The system of claim 1, wherein the at least one processor is further configured to:
    determine sine and cosine components of a discrete Fourier transform of the signal; and
    determine the energy content of the fundamental harmonic of the signal by summing a square of the sine component and a square of the cosine component.

5. The system of claim 1, wherein the at least one processor is further configured to:
    determine the phase of the signal utilizing an output of a bandpass filter.

6. The system of claim 5, wherein the bandpass filter comprises an nT bandpass filter, where n is an integer defined by the fundamental harmonic of the signal.

7. The system of claim 1, wherein the at least one processor is further configured to:
    compare the energy content of the signal to a threshold energy content; and
    determine the quality of the signal based at least partially upon the comparison of the energy content of the signal to the threshold energy content.

8. The system of claim 1, wherein the at least one processor is further configured to:

compare the energy content of the fundamental harmonic of the signal to a specified percentage of the energy content of the signal; and determine the quality of the signal based at least partially upon the comparison of the energy content of the fundamental harmonic of the signal to the specified percentage of the energy content of the signal.

9. The system of claim 1, wherein the at least one processor is further configured to:

compare a difference between the phase of the signal and a target phase to a threshold phase difference; and determine the quality of the signal based at least partially upon the comparison of the difference between the phase of the signal and the target phase to the threshold phase difference.

10. The system of claim 9, wherein the at least one processor is further configured to:

determine the target phase during a zero phase start operation.

11. The system of claim 9, wherein the threshold phase difference is approximately a ½ bit difference.

12. A method of analyzing signal quality, comprising:
receiving a signal from the storage medium;
determining an energy content of the signal;
determining an energy content of a fundamental harmonic of the signal;
determining a phase of the signal; and
determining a quality of the signal based upon at least one of: the energy content of the signal, the energy content of the fundamental harmonic of the signal, and the phase of the signal.

13. The method of claim 12, further comprising:
squaring digital samples derived from the signal; and
determining the energy content of the signal by summing the squares of the digital samples.

14. The method of claim 12, further comprising:
determining sine and cosine components of a discrete Fourier transform of the signal; and
determining the energy content of the fundamental harmonic of the signal by summing a square of the sine component and a square of the cosine component.

15. The method of claim 12, further comprising:
comparing the energy content of the signal to a threshold energy content; and determining the quality of the signal based at least partially upon the comparison of the energy content of the signal to the threshold energy content.

16. The method of claim 12, further comprising:
comparing the energy content of the fundamental harmonic of the signal to a specified percentage of the energy content of the signal; and determining the quality of the signal based at least partially upon the comparison of the energy content of the fundamental harmonic of the signal to the specified percentage of the energy content of the signal.

17. The method of claim 12, further comprising:
comparing a difference between the phase of the signal and a target phase to a threshold phase difference; and determining the quality of the signal based at least partially upon the comparison of the difference between the phase of the signal and the target phase to the threshold phase difference.

18. A method of analyzing signal quality, comprising:
receiving a signal from the storage medium;
comparing an energy content of the signal to a threshold energy content;
comparing an energy content of a fundamental harmonic of the signal to a specified percentage of the energy content of the signal;
comparing a difference between a phase of the signal and a target phase to a threshold phase difference; and
determining a quality of the signal based upon at least one of: the comparison of the energy content of the signal to the threshold energy content, the comparison of the energy content of the fundamental harmonic of the signal to the specified percentage of the energy content of the signal, and the comparison of the difference between the phase of the signal and the target phase to the threshold phase difference.

19. The method of claim 18, further comprising:
squaring digital samples derived from the signal; and
determining the energy content of the signal by summing the squares of the digital samples.

20. The method of claim 18, further comprising:
determining sine and cosine components of a discrete Fourier transform of the signal; and
determining the energy content of the fundamental harmonic of the signal by summing a square of the sine component and a square of the cosine component.

* * * * *